United States Patent
Ghosh et al.

(10) Patent No.: US 11,556,931 B1
(45) Date of Patent: Jan. 17, 2023

(54) SYSTEM AND METHOD FOR OBSERVABILITY, DASHBOARD, ALERTING AND PRO-ACTIVE ACTION MECHANISM

(71) Applicant: JPMorgan Chase Bank, N.A., New York, NY (US)

(72) Inventors: Souma Suvra Ghosh, Wilmington, DE (US); Amit Rajwani, Voorhees, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/366,293

(22) Filed: Jul. 2, 2021

(51) Int. Cl.
*G06Q 20/40* (2012.01)
*G06Q 20/34* (2012.01)

(52) U.S. Cl.
CPC ....... *G06Q 20/4015* (2020.05); *G06Q 20/341* (2013.01)

(58) Field of Classification Search
CPC . G06Q 20/341; G06Q 20/4015; H04L 67/133
See application file for complete search history.

(56) References Cited

U.S. PATENT DOCUMENTS

| | | | | |
|---|---|---|---|---|
| 8,898,681 B1* | 11/2014 | Acheff | ............... | G06F 11/36 |
| | | | | 719/317 |
| 10,289,462 B1* | 5/2019 | Hurtado | ............ | G06F 9/546 |
| 2003/0177150 A1* | 9/2003 | Fung | ................ | G06F 11/203 |
| | | | | 714/E11.131 |
| 2014/0149486 A1* | 5/2014 | Ebright | .......... | G06F 11/3495 |
| | | | | 709/202 |

OTHER PUBLICATIONS

Kyne et al., "Extending IBM z/OS System Management Functions with IBM zAware", IBM Redbooks, Mar. 2013. (Year: 2013).*
Burgess et al., "IBM CICS Performance Series: Effective Monitoring for CICS Performance Benchmarks", IBM Redbooks, 2015. (Year: 2015).*

* cited by examiner

*Primary Examiner* — Eric T Wong
(74) *Attorney, Agent, or Firm* — Greenblum & Bernstein, P.L.C.

(57) ABSTRACT

A system and method for observability, dashboard, alerting and pro-active action framework for card authorizations application are disclosed. A receiver receives a payment authorization request message having a predefined first format via a communication protocol TCPIP socket including an application process called socket manager corresponding to a card transaction. A processor operatively connected to the processor via a communication network collects application data from the message in connection with the card transaction; aggregates and stores the application data onto a dynamically allocated shared memory; reads the aggregated application data from the shared memory; stores the application data in an individual transient data queue attached to the socket manager; converts, in response to reading, the predefined first format of the payment authorization request message to a predefined second format suitable for publishing onto a desired messaging platform; and publishes the converted message onto the desired messaging platform.

20 Claims, 8 Drawing Sheets

SYSTEM AND METHOD FOR OBSERVABILITY, DASHBOARD, ALERTING AND PRO-ACTIVE ACTION MECHANISM

TECHNICAL FIELD

This disclosure generally relates to card authorization applications, and, more particularly, to methods and apparatuses for implementing a robust application monitoring and dashboard module that checks constant health of an application and get notified and alerted when there is any system issue.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Conventional credit card system of an organization may traditionally run on legacy mainframe system. When a customer makes a purchase whether on a terminal or online, an authorization request may be sent to the organization via VISA/MasterCard to the organization to approve or decline the purchase. An authorization system (i.e., a sophisticated rule engine) running on the mainframe system may perform credit and fraud check and then may decide to approve or decline the request.

This authorization system proves to be a very critical system for a credit card as it controls the customer purchase experience. For example, a legitimate request should always be approved, whereas a bank may need to make sure that fraud requests are declined. Thus, this authorization system may need to be available twenty four hours a day and may also provide 100% response time within SLA (service-level agreement) of less than, for example, 50 milliseconds.

As a result, a robust application monitoring system is needed to check the constant health of the application and get notified and alerted when there is any system issue. In addition, there should be a process for automated failover and recovery.

However, the conventional credit card system being a legacy mainframe system, there is no out-of-box such application monitoring system available. Neither there is any product available in market place that can integrate with the application to provide the required application health and automation needed.

SUMMARY

The present disclosure, through one or more of its various aspects, embodiments, and/or specific features or sub-components, provides, among other features, various systems, servers, devices, methods, media, programs, and platforms for implementing a robust application monitoring module on a mainframe system that checks constant health of an application and get notified and alerted when there is any system issue, but the disclosure is not limited thereto. For example, the present disclosure, through one or more of its various aspects, embodiments, and/or specific features or sub-components, provides, among other features, various systems, servers, devices, methods, media, programs, and platforms for building a robust application monitoring module on a mainframe system that may intercept, collect and aggregate metrics data real-time and, then may convert them and make them available to third-party tools. Additionally, the robust application monitoring module according to an aspect of the instant disclosure can integrate back the alerts and feedbacks provided by the third-party tools back to the mainframe system to take certain actions, but the disclosure is not limited thereto. According to an aspect of the present disclosure the framework implemented by the robust application monitoring module is a generic framework that can be implemented on any desired mainframe system and can be adopted for any desired metrics collection and dashboard, but the disclosure is not limited thereto.

According to an aspect of the present disclosure, a method for monitoring application by utilizing one or more processors and one or more memories is disclosed. The method may include: receiving a payment authorization request message having a predefined first format via a communication protocol TCPIP socket including an application process called a socket manager corresponding to a card transaction; collecting application data from the message in connection with the card transaction; aggregating and storing a subset of the application data in a dynamically allocated shared memory and storing location of the dynamically allocated shared memory in a CWA (common work area) which has limited storage capacity but is known and accessible to all the process running in a same CICS region; implementing a monitor process to obtain the location of the dynamically allocated shared memory by accessing the CWA and reading the aggregated application data from the shared memory; storing a current snapshot of aggregated metrics and statistical data in a transient data queue assigned or attached to a specific socket manager; computing a delta or difference of the metrics data by comparing the data with the dynamically allocated shared memory with last saved values of transient data queue for that socket manager; storing, in response to reading, the data into persistence data store for instant access and recovery in case of system failure or application restart; converting, in response to reading, the predefined first format of the aggregated subset of payment authorization request message to a predefined second format suitable for publishing onto a desired messaging platform; and publishing the converted message onto the desired messaging platform.

According to another aspect of the present disclosure, the monitoring process may run on a different CICS system, and therefore, in that scenario the monitoring process has to communicate with the CICS region that hosts the socket manager/shared memory via remote call and instantiate a process there to gain access to the shared memory. This use-case is beneficial when the socket managers are running in different CICS regions in a distributed mode.

According to a further aspect of the present disclosure, the dynamically allocated shared memory may contain command/action data also along with the metrics and statistical data. The command provided from action system which can be feedback coming back as alerts, action from third-party application system or a green screen application, can be acted by the socket manager. Examples of those actions can be stop or recycle socket manager, enable debugging and tracing of messages, route incoming message traffic to a healthy socket manager, etc., but the disclosure is not limited thereto.

According to an additional aspect of the present disclosure, storing the data in dynamically allocated shared memory may give access to multiple processes to read and update the data simultaneously. For example, the socket manager can update the metrics and statistical data; the monitor process can read the latest data and feedback process can apply command on the shared memory which are picked up by socket manager to perform automated actions.

According to another aspect of the present disclosure, wherein the transient data queue is being implemented in an environment that utilizes mixed-language application servers that provide online transaction management and connectivity for applications on predefined mainframe systems, but the disclosure is not limited thereto. According to a further aspect of the present disclosure, wherein the application may also store the metrics and statistical data on to persistence data store like database or file, thereby providing the ability to recover and replay the data in case of system failure or reboot.

According to a further aspect of the present disclosure, wherein the application data may include metrics and statistical data corresponding to the card transaction, but the disclosure is not limited thereto.

According to yet another aspect of the present disclosure, wherein the predefined first format is COBOL copybook format, but the disclosure is not limited thereto, and wherein the predefined second format may include one or more of the following formats: .JSON, .CSV, .HTML, .XML, and .XLS, but the disclosure is not limited thereto.

According to a further aspect of the present disclosure, the method may further include: receiving a plurality of payment authorization request messages via a plurality of communication protocol TCPIP sockets each including a corresponding socket manager; storing the metrics and statistical data in a corresponding transient data queue attached to the corresponding socket manager; periodically collecting metrics and statistical data from all socket manager transient data queues; and aggregating and storing the collected metrics and statistical data from all of the socket manager transient data queues onto the dynamically allocated shared memory. For example, according to an aspect of the present disclosure, the data may flow from the dynamically allocated shred memory to the transient data queues.

According to yet another aspect of the present disclosure, the method may further include: consuming the formatted message from the desired messaging platform by a plurality of visualization tools that provides dashboard feature via different visualization charts such as but not limited to pie chart, bar chart, scattered plot, line plot, time series, etc.; identifying an alert in accordance with predefined rules; transmitting the alter or provide feedback data to mainframe system where the application is running via corresponding application programming interface (API) or message queue (MQ); and triggering an automatic predefined mitigation process, in response to receiving the alert, to mitigate issues identified in the alert or the feedback data.

According to another aspect of the present disclosure, a system for monitoring application is disclosed. The system may include: a processor; and a memory operatively connected to the processor via a communication interface, the memory storing computer readable instructions, when executed, may cause the processor to: receive a payment authorization request message having a predefined first format via a communication protocol TCPIP socket including an application process called a socket manager corresponding to a card transaction; collect application data from the message in connection with the card transaction; aggregate and store a subset of the application data in a dynamically allocated shared memory and store location of the dynamically allocated shared memory in a CWA (common work area) which has a limited storage capacity but is known and accessible to all the process running in a same CICS region; implement a monitor process to obtain the location of the dynamically allocated shared memory by accessing the CWA and read the aggregated application data from the shared memory; store a current snapshot of aggregated metrics and statistical data in a transient data queue assigned or attached to a specific socket manager; compute a delta or difference of the metrics data by comparing the data with the dynamically allocated shared memory with last saved values of transient data queue for that socket manager; store, in response to reading, the data into persistence data store for instant access and recovery in case of system failure or application restart; convert, in response to reading, the predefined first format of the aggregated subset of payment authorization request message to a predefined second format suitable for publishing onto a desired messaging platform; and publish the converted message onto the desired messaging platform.

According to a further aspect of the present disclosure, wherein the processor may be further configured to: receive a plurality of payment authorization request messages via a plurality of communication protocol TCPIP sockets each including a corresponding socket manager; store the metrics and statistical data in a corresponding transient data queue attached to the corresponding socket manager; periodically collect metrics and statistical data from all socket manager transient data queues; and aggregate and store the collected metrics and statistical data from all of the socket manager transient data queues onto the dynamically allocated shared memory. For example, according to an aspect of the present disclosure, the data may flow from the dynamically allocated shred memory to the transient data queues.

According to an additional aspect of the present disclosure, wherein the processor may be further configured to: consume the formatted message from the desired messaging platform by a plurality of visualization tools that provides dashboard feature via different visualization charts such as but not limited to pie chart, bar chart, scattered plot, line plot, time series, etc.; identify an alert in accordance with predefined rules; transmit the alter or provide feedback data to mainframe system where the application is running via corresponding application programming interface (API) or message queue (MQ); and trigger an automatic predefined mitigation process, in response to receiving the alert, to mitigate issues identified in the alert or the feedback data.

According to yet another aspect of the present disclosure, a non-transitory computer readable medium configured to store instructions for monitoring application is disclosed. The instructions, when executed, may cause a processor to perform the following: receiving a payment authorization request message having a predefined first format via a communication protocol TCPIP socket including an application process called a socket manager corresponding to a card transaction; collecting application data from the message in connection with the card transaction; aggregating and storing a subset of the application data in a dynamically allocated shared memory and storing location of the dynamically allocated shared memory in a CWA (common work area) which has limited storage capacity but is known and accessible to all the process running in that CICS region; implementing a monitor process to obtain the location of the dynamically allocated shared memory by accessing the CWA and reading the aggregated application data from the shared memory; storing a current snapshot of aggregated metrics and statistical data in a transient data queue assigned or attached to a specific socket manager; computing a delta or difference of the metrics data by comparing the data with the dynamically allocated shared memory with last saved values of transient data queue for that socket manager; storing, in response to reading, the data into persistence data store for instant access and recovery in case of system failure or application restart; converting, in response to reading, the predefined first format of the aggregated subset of payment authorization request message to a predefined second format suitable for publishing onto a desired messaging platform; and publishing the converted message onto the desired messaging platform.

According to a further aspect of the present disclosure, the instructions, when executed, may cause the processor to further perform the following: receiving a plurality of payment authorization request messages via a plurality of communication protocol TCPIP sockets each including a corresponding socket manager; storing the metrics and statistical data in a corresponding transient data queue attached to the corresponding socket manager; periodically collecting metrics and statistical data from all socket manager transient data queues; and aggregating and storing the collected metrics and statistical data from all of the socket manager transient data queues onto the dynamically allocated shared memory. For example, according to an aspect of the present disclosure, the data may flow from the dynamically allocated shred memory to the transient data queues.

According to a further aspect of the present disclosure, the instructions, when executed, may cause the processor to further perform the following: consuming the formatted message from the desired messaging platform by a plurality of visualization tools that provides dashboard feature via different visualization charts such as but not limited to pie chart, bar chart, scattered plot, line plot, time series, etc.; identifying an alert in accordance with predefined rules; transmitting the alter or provide feedback data to mainframe system where the application is running via corresponding application programming interface (API) or message queue (MQ); and triggering an automatic predefined mitigation process in one scenario by updating the command section of the shared memory that is watched constantly or periodically by the socket manager, in response to receiving the alert, to mitigate issues identified in the alert or the feedback data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
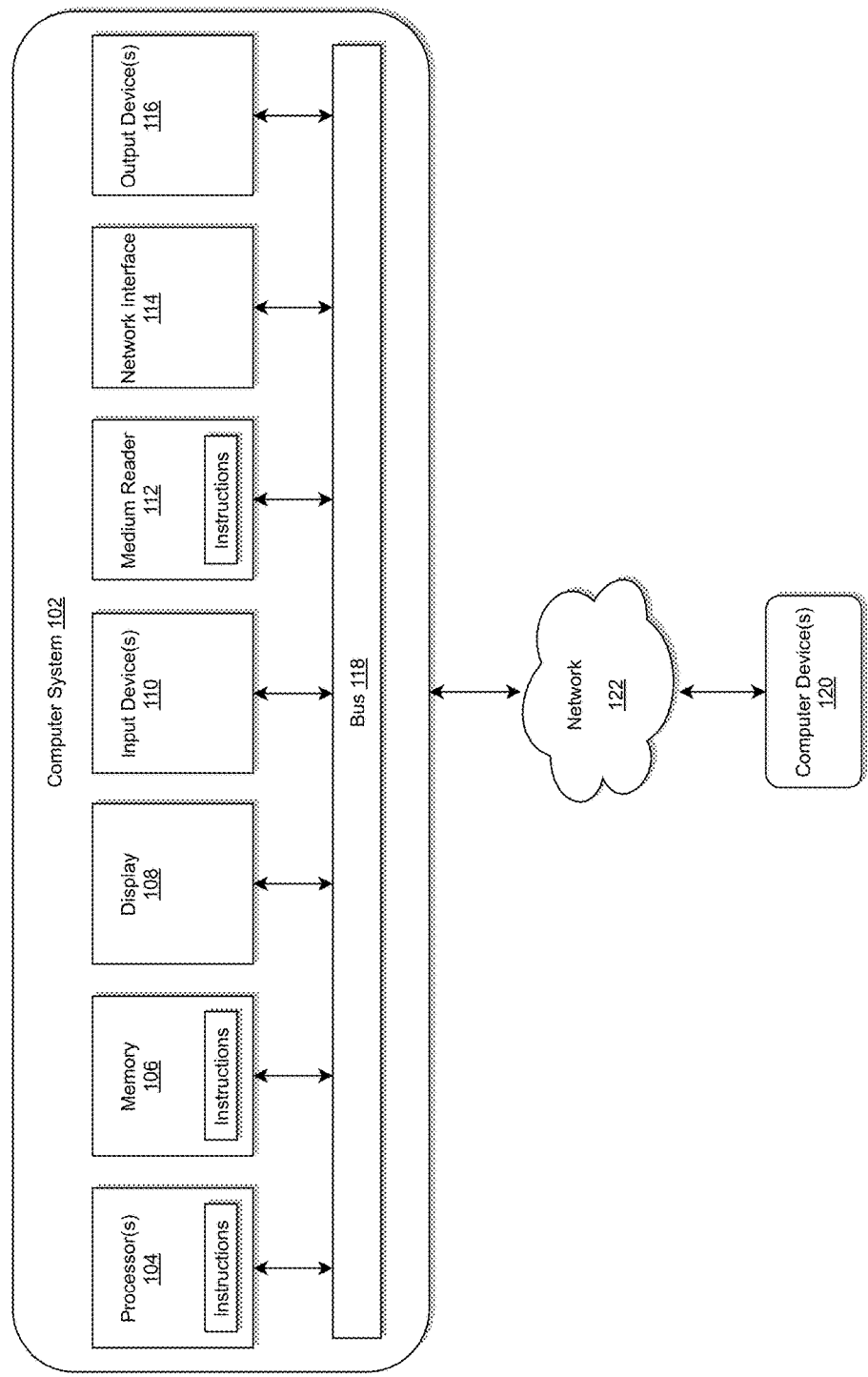
FIG. 1 illustrates a computer system for implementing a robust application monitoring module that checks constant health of an application and get notified and alerted when there is any system issue in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a robust application monitoring module that checks constant health of an application and get notified and alerted when there is any system issue in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
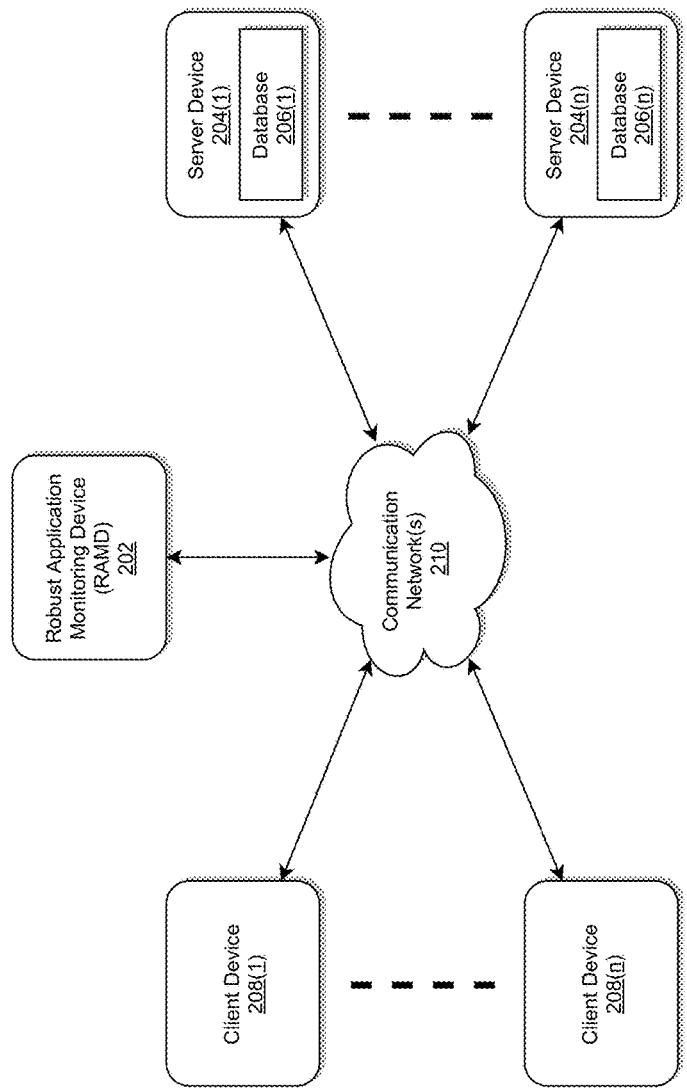
FIG. 2 illustrates an exemplary diagram of a network environment with a robust application monitoring device in accordance with an exemplary embodiment.

Referring to FIG. 2, a schematic of an exemplary network environment 200 for implementing a robust application monitoring device (RAMD) of the instant disclosure is illustrated.

According to exemplary embodiments, the above-described problems associated with conventional approach may be overcome by implementing a RAMD 202 as illustrated in FIG. 2 that may provide a platform for implementing a robust application monitoring module on a mainframe system that checks constant health of an application and get notified and alerted when there is any system issue, but the disclosure is not limited thereto. For example, according to exemplary embodiments, the RAMD 202 may be configured to build a robust application monitoring module on a mainframe system that may intercept, collect and aggregate metrics data real-time and, then may convert them and make them available to third-party tools. Additionally, the RAMD 202 according to exemplary embodiments may integrate back the alerts and feedbacks provided by the third-party tools back to the mainframe system to take certain actions, but the disclosure is not limited thereto. According to exemplary embodiments, the framework implemented by the RAMD 202 may be a generic framework that can be implemented on any desired mainframe system and can be adopted for any desired metrics collection and dashboard, but the disclosure is not limited thereto.

The RAMD 202 may be the same or similar to the computer system 102 as described with respect to FIG. 1.

The RAMD 202 may store one or more applications that can include executable instructions that, when executed by the RAMD 202, cause the RAMD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RAMD 202 itself, may be located in virtual server(s) running in a cloud-based computing environment rather than being tied to one or more specific physical network computing devices. Also, the application(s) may be running in one or more virtual machines (VMs) executing on the RAMD 202. Additionally, in one or more embodiments of this technology, virtual machine(s) running on the RAMD 202 may be managed or supervised by a hypervisor.

In the network environment 200 of FIG. 2, the RAMD 202 is coupled to a plurality of server devices 204(1)-204(n) that hosts a plurality of databases 206(1)-206(n), and also to a plurality of client devices 208(1)-208(n) via communication network(s) 210. A communication interface of the RAMD 202, such as the network interface 114 of the computer system 102 of FIG. 1, operatively couples and communicates between the RAMD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RAMD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RAMD 202 may be a standalone device or integrated with one or more other devices or apparatuses, such as one or more of the server devices 204(1)-204(n), for example. In one particular example, the RAMD 202 may be hosted by one of the server devices 204(1)-204(n), and other arrangements are also possible. Moreover, one or more of the devices of the RAMD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RAMD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the RAMD 202 that may efficiently provide a platform for implementing a robust application monitoring module on a mainframe system that checks constant health of an application and get notified and alerted when there is any system issue, but the disclosure is not limited thereto.

The client devices 208(1)-208(n) may run interface applications, such as standard web browsers or standalone client applications, which may provide an interface to communicate with the RAMD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the RAMD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RAMD 202, the server devices 204(1)-204(n), or the client devices 208(1)-208(n), for example, may be configured to operate as virtual instances on the same physical machine. For example, one or more of the RAMD 202, the server devices 204(1)-204(n), or the client devices 208(1)-208(n) may operate on the same physical device rather than as separate devices communicating through communication network(s) 210. Additionally, there may be more or fewer RAMDs 202, server devices 204(1)-204(n), or client devices 208(1)-208(n) than illustrated in FIG. 2. According to exemplary embodiments, the RAMD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
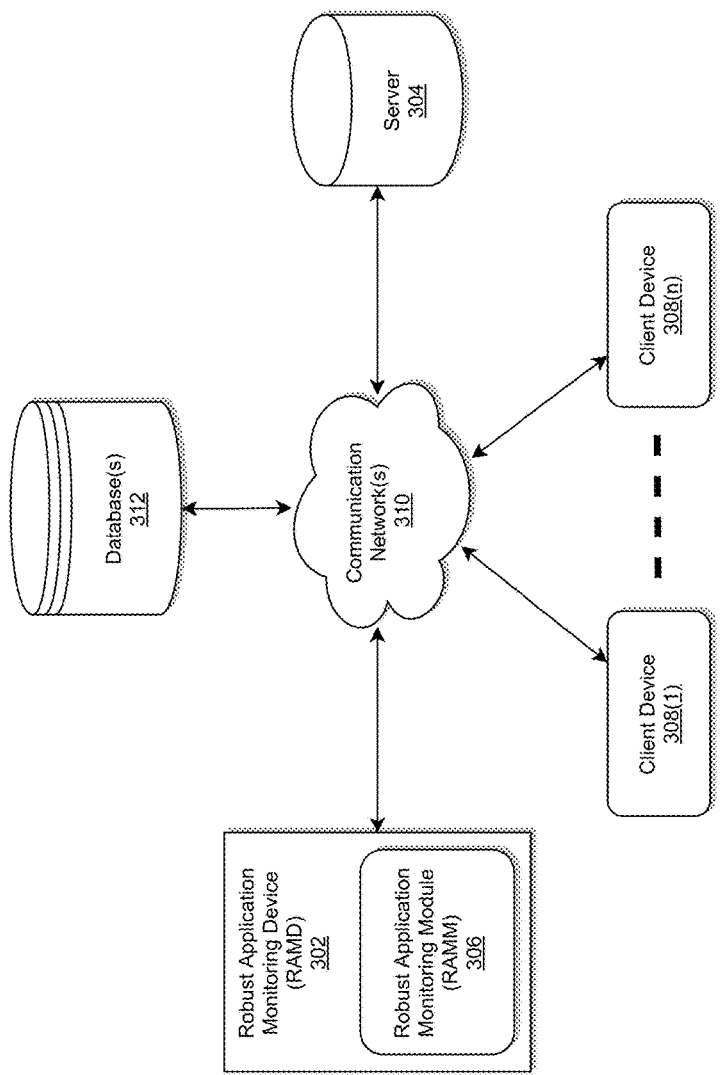
FIG. 3 illustrates a system diagram for implementing a robust application monitoring device with a robust application monitoring module in accordance with an exemplary embodiment.

FIG. 3 illustrates a system diagram for implementing a RAMD having a robust application monitoring module (RAMM) in accordance with an exemplary embodiment.

As illustrated in FIG. 3, the system 300 may include a RAMD 302 within which a RAMM 306 is embedded, a server 304, a database(s) 312, a plurality of client devices 308(1) . . . 308(n), and a communication network 310.

According to exemplary embodiments, the RAMD 302 including the RAMM 306 may be connected to the server 304, and the database(s) 312 via the communication network 310. Although there is only one database has been illustrated, the disclosure is not limited thereto. Any number of databases may be utilized. The RAMD 302 may also be connected to the plurality of client devices 308(1) . . . 308(n) via the communication network 310, but the disclosure is not limited thereto.

According to exemplary embodiment, the RAMD 302 is described and shown in FIG. 3 as including the RAMM 306, although it may include other rules, policies, modules, databases, or applications, for example. According to exemplary embodiments, the database(s) 312 may be embedded within the RAMD 302. According to exemplary embodiments, the database(s) 312 may be configured to store user information data, card transaction data, payment format data etc., but the disclosure is not limited thereto.

According to exemplary embodiments, the RAMM 306 may be configured to receive real-time feed of data from the plurality of client devices 308(1) . . . 308(n) via the communication network 310.

According to exemplary embodiments, as will be described below, the RAMM 306 may be configured to receive a payment authorization request message having a predefined first format via a communication protocol TCPIP socket including an application process called a socket manager corresponding to a card transaction; collect application data from the message in connection with the card transaction; aggregate and store a subset of the application data in a dynamically allocated shared memory and store location of the dynamically allocated shared memory in a CWA (common work area) which has a limited storage capacity but is known and accessible to all the process running in a same CICS region; implement a monitor process to obtain the location of the dynamically allocated shared memory by accessing the CWA and read the aggregated application data from the shared memory; store a current snapshot of aggregated metrics and statistical data in a transient data queue assigned or attached to a specific socket manager; compute a delta or difference of the metrics data by comparing the data with the dynamically allocated shared memory with last saved values of transient data queue for that socket manager; convert, in response to reading, the predefined first format of the aggregated subset of payment authorization request message to a predefined second format suitable for publishing onto a desired messaging platform; and publish the converted message onto the desired messaging platform, but the disclosure is not limited thereto.

The plurality of client devices 308(1) . . . 308(n) are illustrated as being in communication with the RAMD 302. In this regard, the plurality of client devices 308(1) . . . 308(n) may be "clients" of the RAMD 302 and are described herein as such. Nevertheless, it is to be known and understood that the plurality of client devices 308(1) . . . 308(n) need not necessarily be "clients" of the RAMD 302, or any entity described in association therewith herein. Any additional or alternative relationship may exist between either or both of the plurality of client devices 308(1) . . . 308(n) and the RAMD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the RAMD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The RAMD 302 may be the same or similar to the RAMD 202 as described with respect to FIG. 2, including any features or combination of features described with respect thereto.

Figure 4:
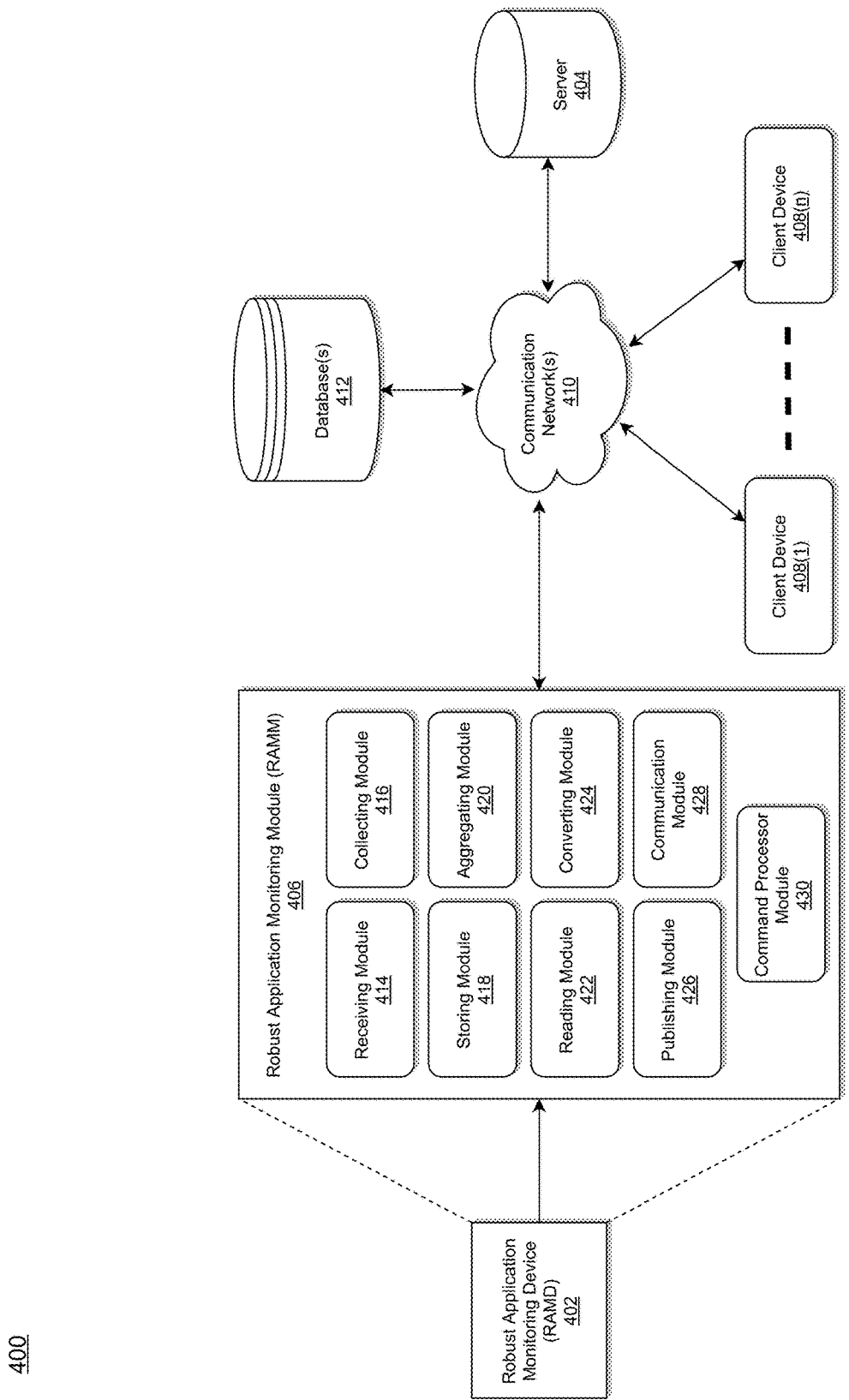
FIG. 4 illustrates a system diagram for implementing a robust application monitoring module of FIG. 3 in accordance with an exemplary embodiment.

FIG. 4 illustrates a system diagram for implementing a robust application monitoring and dashboard module (RAMM) of FIG. 3 in accordance with an exemplary embodiment.

According to exemplary embodiments, the system 400 may include a robust application monitoring device (RAMD) 402 within which a RAMM 406 is embedded, a server 404, a database(s) 412, and a communication network 410.

According to exemplary embodiments, the RAMD 402 including the RAMM 406 may be connected to the server 404, and the database(s) 412 via the communication network 410. The RAMD 402 may also be connected to the plurality of client devices 408(1) . . . 408(n) via the communication network 410, but the disclosure is not limited thereto. According to exemplary embodiments, the RAMD 402, the RAMM 406, the database(s) 412, the server 404, the client devices 408(1)-408(n), and the communication network 410 as illustrated in FIG. 4 may be the same or similar to the RAMD 302, the RAMM 306, the database(s) 312, the server 304, the client devices 308(1)-308(n), and the communication network 310, respectively, as illustrated in FIG. 3.

According to exemplary embodiments, as illustrated in FIG. 4, the RAMM 406 may include a receiving module 414, a collecting module 416, a storing module 418, an aggregating module 420, a reading module 422, a converting module 424, a publishing module 426, a communication module 428 and a command processor module 430.

The process may be executed via the communication module 428 and the communication network 410, which may comprise plural networks as described above. For example, in an exemplary embodiment, the various components of the RAMM 406 may communicate with the server 404, and the database(s) 412 via the communication module 428 and the communication network 410. Of course, these embodiments are merely exemplary and are not limiting or exhaustive.

According to exemplary embodiments, the communication network 410 and the communication module 428 may be configured to establish a link between the database(s) 412, the client devices 408(1)-408(n) and the RAMM 406.

According to exemplary embodiments, each of the receiving module 414, collecting module 416, storing module 418, aggregating module 420, reading module 422, converting module 424, publishing module 426, communication module 428 and the command processor module 430 may be implemented by microprocessors or similar, they may be programmed using software (e.g., microcode) to perform various functions discussed herein and may optionally be driven by firmware and/or software. Alternatively, each of the receiving module 414, collecting module 416, storing module 418, aggregating module 420, reading module 422, converting module 424, publishing module 426, communication module 428 and the command processor module 430 may be implemented by dedicated hardware, or as a combination of dedicated hardware to perform some functions and a processor (e.g., one or more programmed microprocessors and associated circuitry) to perform other functions. Also, according to exemplary embodiments, each of the receiving module 414, collecting module 416, storing module 418, aggregating module 420, reading module 422, converting module 424, publishing module 426, communication module 428 and the command processor module 430 may be physically separated into two or more interacting and discrete blocks, units, devices, and/or modules without departing from the scope of the inventive concepts.

According to exemplary embodiments, each of the receiving module 414, collecting module 416, storing module 418, aggregating module 420, reading module 422, converting module 424, publishing module 426, communication module 428 and the command processor module 430 of the RAMM 406 may be called by corresponding API, but the disclosure is not limited thereto.

Figure 5:
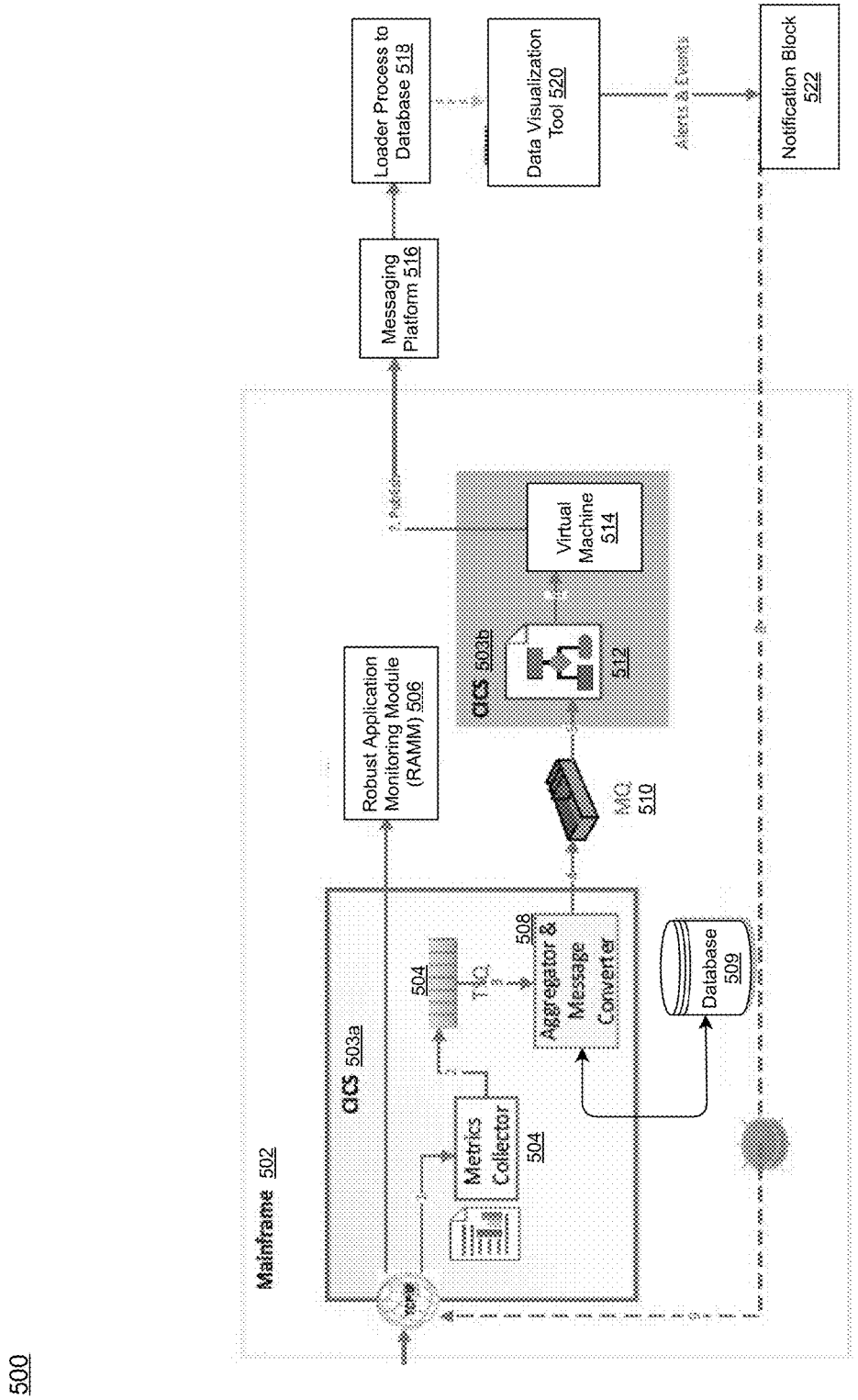
FIG. 5 illustrates an exemplary system architecture with the robust application monitoring module of FIG. 4 in accordance with an exemplary embodiment.
Figure 6:
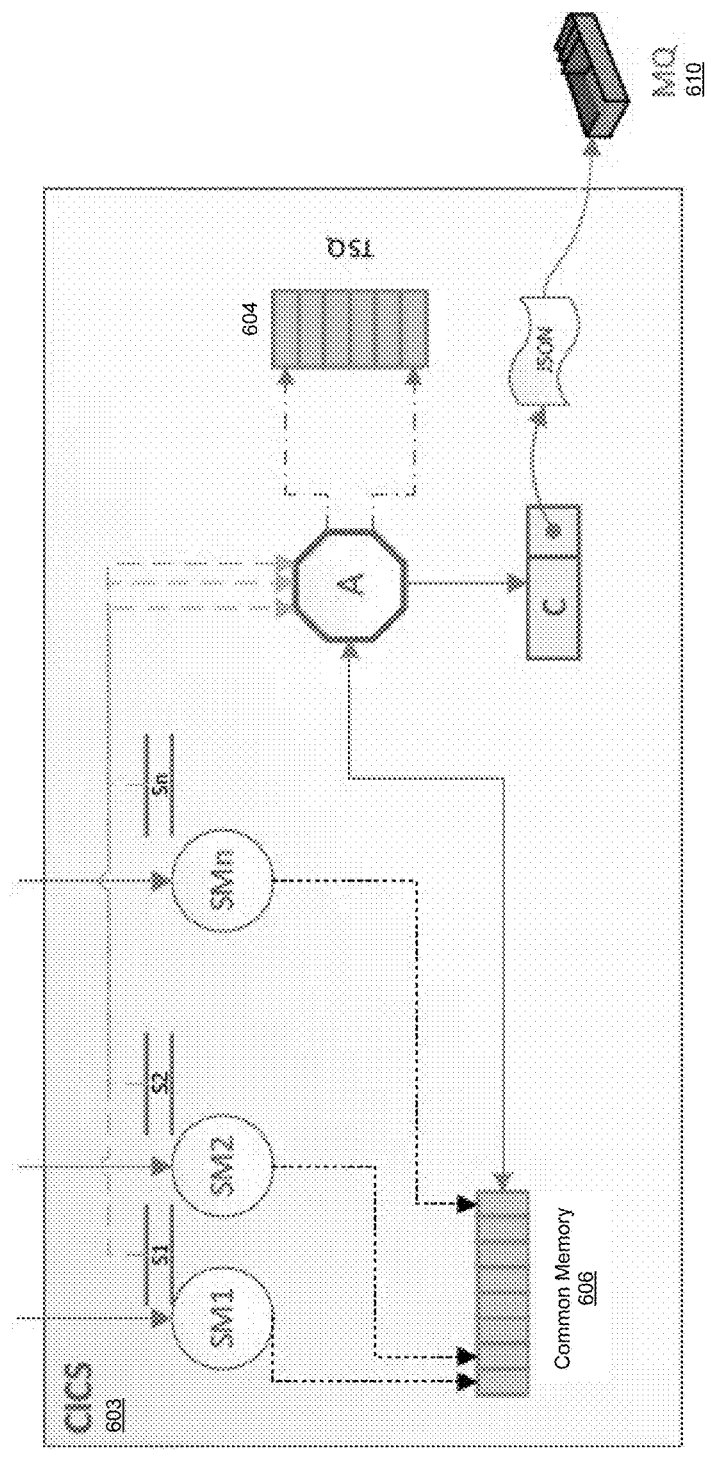
FIG. 6 illustrates an exemplary metrics collection and conversion process implemented by the robust application monitoring module of FIG. 4 in accordance with an exemplary embodiment.
Figure 7:
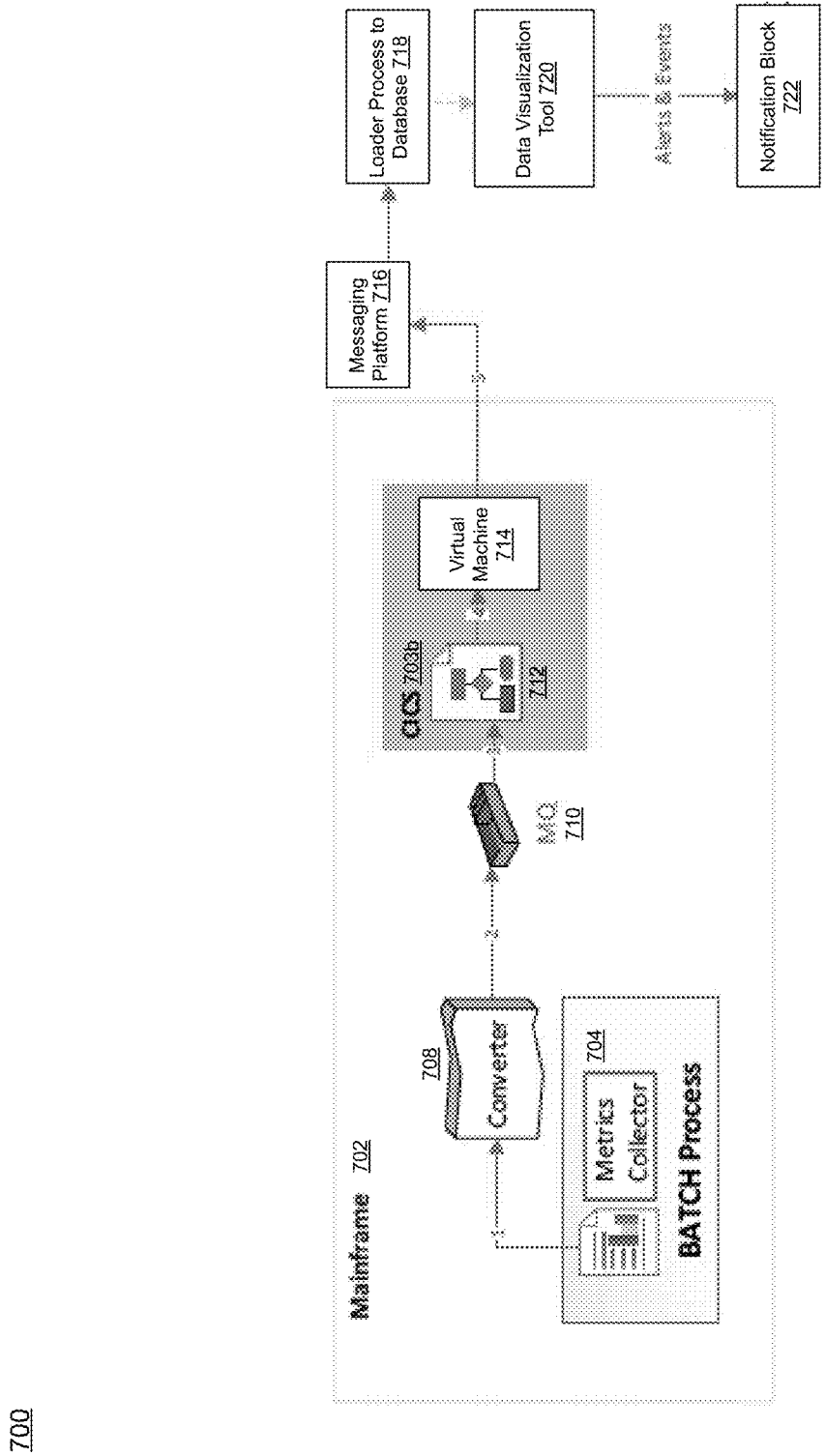
FIG. 7 illustrates an exemplary framework implemented by the robust application monitoring module of FIG. 4 for batch applications in accordance with an exemplary embodiment.

FIG. 5 illustrates an exemplary system architecture 500 with the RAMM 406 of FIG. 4 in accordance with an exemplary embodiment. FIG. 6 illustrates an exemplary metrics collection and conversion process 600 implemented by the RAMM 406 of FIG. 4 in accordance with an exemplary embodiment. FIG. 7 illustrates an exemplary framework 700 implemented by the RAMM 406 of FIG. 4 for batch applications in accordance with an exemplary embodiment.

Referring to FIGS. 4-7, according to exemplary embodiments, the receiving module 414 may be configured to receive a payment authorization request message having a predefined first format via a communication protocol TCPIP socket including an application process called a socket manager corresponding to a card transaction.

According to exemplary embodiments, the collecting module 416 may be configured to collect application data from the message in connection with the card transaction.

According to exemplary embodiments, the aggregating module 420 and the storing module may be configured to aggregate and store a subset of the application data in a dynamically allocated shared memory and storing location of the dynamically allocated shared memory in a CWA (common work area) (e.g., a common memory as illustrated in FIG. 6) which has limited storage capacity but is known and accessible to all the process running in a same CICS region.

According to exemplary embodiments, the RAMM 406 may be configured to implement a monitor process to obtain the location of the dynamically allocated shared memory (e.g., a common memory as illustrated in FIG. 6) by accessing the CWA and reading the aggregated application data from the shared memory by utilizing the reading module 422.

According to exemplary embodiments, the storing module 418 may be configured to store a current snapshot of aggregated metrics and statistical data in a transient data queue assigned or attached to a specific socket manager; computing a delta or difference of the metrics data by comparing the data with the dynamically allocated shared memory with last saved values of transient data queue (i.e., 504 as illustrated in FIG. 5 and/or 604 as illustrated in FIG. 6) for that socket manager. According to exemplary embodiments, the storing module 418 may be further configured to store, in response to reading, the data into persistence data store for instant access and recovery in case of system failure or application restart.

According to exemplary embodiments, the converting module 424 may be configured to convert, in response to reading, the predefined first format of the aggregated subset of payment authorization request message to a predefined second format suitable for publishing onto a desired messaging platform According to exemplary embodiments, the publishing module 426 may be configured to publish the converted message onto the desired messaging platform.

According to exemplary embodiments, the command processor module 430 may be configured to receive the feedback/alerts from the visualization tools. For example, according to exemplary embodiments, the dynamically allocated shared memory may contain command/action data also along with the metrics and statistical data. The command provided from action system, which can be feedback coming back as alerts, action from third-party application system or a green screen application, can be acted by the socket manager. Examples of those actions can be stop or recycle socket manager, enable debugging and tracing of messages, route incoming message traffic to a healthy socket manager, etc., but the disclosure is not limited thereto.

According to exemplary embodiments, storing the data in dynamically allocated shared memory by the storing module 418 may give access to multiple processes to read and update the data simultaneously. For example, the socket manager can update the metrics and statistical data; the monitor process implemented by the RAMM 406 can read the latest data and feedback process can apply command on the shared memory which are picked up by socket manager to perform automated actions.

According to exemplary embodiments, wherein the transient data queue (i.e., 504 as illustrated in FIG. 5 and/or 604 as illustrated in FIG. 6) may be implemented in an environment that utilizes mixed-language application servers that provide online transaction management and connectivity for applications on predefined mainframe systems (i.e., mainframe 502 as illustrated in FIG. 5 and/or mainframe 702 as illustrated in FIG. 7), but the disclosure is not limited thereto.

According to exemplary embodiments, wherein the application data may include metrics and statistical data corresponding to the card transaction, but the disclosure is not limited thereto.

According to exemplary embodiments, wherein the predefined first format is COBOL copybook format, but the disclosure is not limited thereto, and wherein the predefined second format may include one or more of the following formats: .JSON, .CSV, .HTML, .XML, and .XLS, but the disclosure is not limited thereto.

According to exemplary embodiments, the receiving module 414 may be configured to receive a plurality of payment authorization request messages via a plurality of communication protocol sockets each including a corresponding socket manager. The storing module 418 may be configured to store the metrics and statistical data in a corresponding transient data queue (i.e., 504 as illustrated in FIG. 5 and/or 604 as illustrated in FIG. 6) attached to the corresponding socket manager.

According to exemplary embodiment, the collecting module 416 may be configured to periodically collect metrics and statistical data from all socket manager and store it on shared memory (i.e., 504 as illustrated in FIG. 5).

According to exemplary embodiments the aggregating module 420 may be configured to aggregate and store the collected metrics and statistical data from all of the socket manager transient data queues (i.e., 504 as illustrated in FIG. 5 and/or 604 as illustrated in FIG. 6) onto a shared memory (e.g., a common memory as illustrated in FIG. 6).

According to exemplary embodiments, a plurality of visualization tools (520 as illustrated in FIG. 5 and/or 720 as illustrated in FIG. 7) may consume the formatted message from the desired messaging platform (516 as illustrated in FIG. 5 and/or 716 as illustrated in FIG. 7). According to exemplary embodiments, the plurality of visualization tools (520 as illustrated in FIG. 5 and/or 720 as illustrated in FIG. 7) may provide dashboard feature via different visualization charts such as but not limited to pie chart, bar chart, scattered plot, line plot, time series, etc., but the disclosure is not limited thereto.

According to exemplary embodiments, the RAMM 406, 506 may identify an alert in accordance with predefined rules; transmit the alter or provide feedback data to mainframe system 502, 702 where the application is running via corresponding application programming interface (API) or message queue (MQ) 510, 610, 710 by utilizing the notification block 522, 722; and trigger an automatic predefined mitigation process in one scenario by updating the command section of the shared memory that is watched constantly or periodically by the socket manager, in response to receiving the alert, to mitigate issues identified in the alert or the feedback data.

As disclosed above, FIG. 5 illustrates an exemplary system architecture 500 with the RAMM 406 of FIG. 4 in accordance with an exemplary embodiment. For example, as illustrated in FIG. 5, a card authorization application on mainframe system 502 runs on CICS environment 503a and receives the payment authorization request messages via TCPIP sockets. The TCPIP communicator program called socket manager then forwards the messages to the backend process where data enrichment and decisioning happens.

According to the exemplary system architecture 500 as illustrated in FIG. 5, at step 1, a long running process running in the same CICS region 503a as socket manager intercepts the messages that are exchanged by socket manager programs with backend, collects and calculates the important metrics by utilizing the metrics collector 504. At step 2, the metrics are stored in individual TSQ 504 attached to the socket manager program. At step 3, the application metrics data collected by the COBOL program converts the message from COBOL layout to JSON layout using the JSON generator API available in COBOL version 6 by utilizing the aggregator and message converter 508. At step 4, the JSON converted metrics is written into MQ 510 (e.g., an IBM MQ). At step 5, the JSON messages from IBM MQ 510 triggers a COBOL CICS program 512 on another CICS region 503b on which a virtual machine 514 (e.g., Java Virtual Machine) is being activated. At step 6, the COBOL program formats the messages and link a Java process running inside the virtual machine 514 publishes the messages to a messaging Kafka topic using Kafka client libraries. At step 7, the Java process publishes the JSON message to a messaging platform 516 (e.g., Kafka). Once the messages are published to Kafka topic, they are consumed by loader process to database 518 and is available for consumption by a visualization tool 520 like Kibana, Grafana, etc. At step 8, the visualization tool 520 identifies the alert as per rule defined and sends an alert/feedback to the mainframe system 502 via API, MQ, etc., by utilizing the notification block 522. At step 9, the triggered process on receiving the alert takes appropriate action as pre-defined to mitigate the issue in an automated fashion.

According to exemplary embodiments, the MQ message triggers the CICS transaction that reads the MQ message; creates and appends an INDEX/KEY to the message to be used in data store. The COBOL program link to the Java JVM (e.g., virtual machine 514) process running in the same CICS region 503b and then passes the prepared message for publish. The Java JVM process collects the JSON formatted message from COBOL; converts from EBCDIC to ASCII; and publishes the messages to Kafka topic using Kafka client libraries.

According to exemplary embodiments, data collected for recovery purpose may be stored onto database 509 on mainframe. For example, according to exemplary embodiment, the application may also store the metrics and statistical data on to persistence data store like database 509 or file, thereby providing the ability to recover and replay the data in case of system failure or reboot.

As disclosed above, FIG. 6 illustrates an exemplary metrics collection and conversion process 600 implemented by the RAMM 406 of FIG. 4 in accordance with an exemplary embodiment. According to exemplary embodiments, the socket manager process are CICS (e.g., 603 in FIG. 6) COBOL program that implements TCPIP socket interface to receive and send messages (e.g., credit card authorization request). The messages are delivered to backend for processing business logic and the reply is sent back via TCPIP connection.

According to exemplary embodiments, the socket manager (e.g., SM1, SM2, . . . SMn) is initiated when a connection request is made by another system (e.g., client), and at its startup process—i) acquires a memory location in shared mode; the metrics and statistical data will be stored in that memory; and ii) obtains the address to a common memory 606 which is accessible to all processes running in that CICS region 603 and inserts a record that indicates the location of the shared memory.

According to exemplary embodiments, the socket manager (e.g., SM1, SM2, . . . SMn) constantly collects the metrics data from each business messages and update them on shared memory thus making it instantly available.

A long running CICS process (A) that runs periodically finds the location of the shared memory 606 for each socket manager (e.g., SM1, SM2, . . . SMn) by accessing the common memory 606 which implements the following processes: i) creates a CICS TSQ to store the last collected metrics; ii) from each shared memory collects the latest metrics and compare them with last stored data in TSQ to generate the delta; iii) once the delta for that interval is calculated, it stores the latest values to the TSQ.

According to exemplary embodiments, the new metrics calculated is then passed to a converter (C) which takes the message in COPYBOOK format and converts it into JSON format by using the COBOL 6 JSON converter API. The message is also converted to UTF-8 format from EBCDIC format that mainframe system use.

Finally, the JSON formatted message is put into the MQ 610.

As disclosed above, FIG. 7 illustrates an exemplary framework 700 implemented by the RAMM 406 of FIG. 4 for batch applications in accordance with an exemplary embodiment. In batch pattern, the framework 700 also provides seamless integration for batch applications. In this scenario, the metrics and stats collected (e.g., by utilizing the metrics collector 704) by batch process (Mainframe Batch Jobs) are converted (e.g., by utilizing the JSON converter 706) and inserted to MQ 710 directly from the batch process. The JSON converter 706 is common for both online CICS as illustrated in FIGS. 5-6 and batch process as illustrated in FIG. 7.

Rules can be set on dashboard tools like Grafana, Kibana, etc. which can send the alerts when a threshold is breached to the system to perform certain actions. The actions can be delivered via API, MQ, gRPC, etc. calls.

Mainframe system 702 exposes listeners that listens to the incoming alerts via any of these channels and take pre-defined action e.g., routing the traffic to healthy nodes/serves, scaling up or scaling down capacity, etc.

For example, as illustrated in FIG. 7, the JSON messages from the MQ 710 triggers a COBOL CICS program 712 on CICS region 703*b* on which a virtual machine 714 (e.g., Java Virtual Machine) is being activated. The COBOL program formats the messages and link a Java process running inside the virtual machine 714 publishes the messages to a messaging Kafka topic using Kafka client libraries. The Java process publishes the JSON message to a messaging platform 716 (e.g., Kafka). Once the messages are published to Kafka topic, they are consumed by loader process to database 718 and is available for consumption by a visualization tool 720 like Kibana, Grafana, etc. The visualization tool 720 identifies the alert as per rule defined and sends an alert/feedback to the mainframe system 702 via API, MQ, gRPC, etc. calls by utilizing the notification block 722. The triggered process on receiving the alert takes appropriate action as pre-defined to mitigate the issue in an automated fashion.

Figure 8:
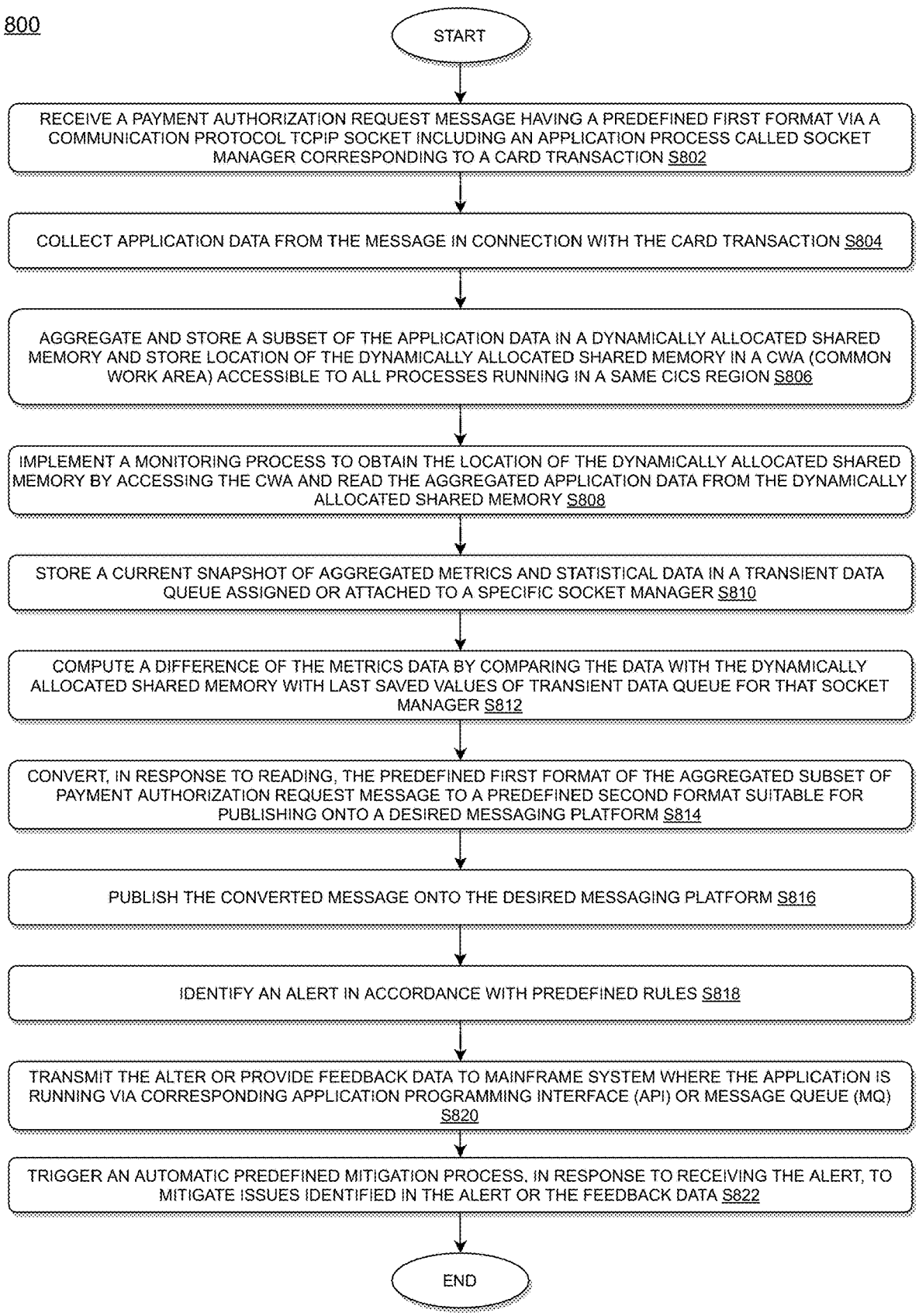
FIG. 8 illustrates a flow chart of implementing a robust application monitoring module that checks constant health of an application and get notified and alerted when there is any system issue in accordance with an exemplary embodiment.

FIG. 8 illustrates a flow chart of a process 800 implemented by the RAMM 406 of FIG. 4 for automatic generation of a contract data tree structure of a plurality of contracts in accordance with an exemplary embodiment. It will be appreciated that the illustrated process 800 and associated steps may be performed in a different order, with illustrated steps omitted, with additional steps added, or with a combination of reordered, combined, omitted, or additional steps.

As illustrated in FIG. 8, at step S802, the process 800 may include receiving a payment authorization request message having a predefined first format via a communication protocol TCPIP socket including an application process called socket manager corresponding to a card transaction.

At step S804, the process 800 may include collecting application data from the message in connection with the card transaction.

At step S806, the process 800 may include aggregating and storing a subset of the application data in a dynamically allocated shared memory and storing location of the dynamically allocated shared memory in a CWA (common work area) accessible to all processes running in a same CICS region.

At step S808, the process 800 may include implementing a monitoring process to obtain the location of the dynamically allocated shared memory by accessing the CWA and reading the aggregated application data from the dynamically allocated shared memory.

At step S810, the process 800 may include storing a current snapshot of aggregated metrics and statistical data in a transient data queue assigned or attached to a specific socket manager.

At step S812, the process 800 may include computing a difference of the metrics data by comparing the data with the dynamically allocated shared memory with last saved values of transient data queue for that socket manager.

At step S814, the process 800 may include converting, in response to reading, the predefined first format of the aggregated subset of payment authorization request message to a predefined second format suitable for publishing onto a desired messaging platform.

At step S816, the process 800 may include publishing the converted message onto the desired messaging platform.

According to another aspect of the present disclosure, wherein in the process 800, the transient data queue may be implemented in an environment that utilizes mixed-language application servers that provide online transaction management and connectivity for applications on predefined mainframe systems, but the disclosure is not limited thereto.

According to exemplary embodiments, the process 800 may further include: receiving a plurality of payment authorization request messages via a plurality of communication protocol TCPIP sockets each including a corresponding socket manager; storing the metrics and statistical data in a corresponding transient data queue attached to the corresponding socket manager; periodically collecting metrics and statistical data from all socket manager transient data queues; and aggregating and storing the collected metrics and statistical data from all of the socket manager transient data queues onto the dynamically allocated shared memory. For example, according to exemplary embodiments, the data may flow from the dynamically allocated shred memory to the transient data queues.

According to exemplary embodiments, the process 800 may further include: consuming the formatted message from the desired messaging platform by a plurality of visualization tools that provides dashboard feature via different visualization charts such as but not limited to pie chart, bar chart, scattered plot, line plot, time series, etc., but the disclosure is not limited thereto. According to exemplary embodiments, at step S818, the process may further include identifying an alert in accordance with predefined rules. At step S820, the process 800 may further include transmitting the alter or provide feedback data to mainframe system where the application is running via corresponding application programming interface (API) or message queue (MQ). At step S822, the process 800 may further include triggering an automatic predefined mitigation process in one scenario by updating the command section of the shared memory that is watched constantly or periodically by the socket manager, in response to receiving the alert, to mitigate issues identified in the alert or the feedback data.

According to exemplary embodiments, the RAMD 402 may include a memory (e.g., a memory 106 as illustrated in FIG. 1) which may be a non-transitory computer readable medium that may be configured to store instructions for implementing a RAMM 406 for monitoring an application as disclosed herein. The RAMD 402 may also include a medium reader (e.g., a medium reader 112 as illustrated in FIG. 1) which may be configured to read any one or more sets of instructions, e.g., software, from any of the memories described herein. The instructions, when executed by a processor embedded within the RAMM 406 or within the RAMD 402, may be used to perform one or more of the methods and processes as described herein. In a particular embodiment, the instructions may reside completely, or at least partially, within the memory 106, the medium reader 112, and/or the processor 104 (see FIG. 1) during execution by the RAMD 402.

According to exemplary embodiments, the instructions, when executed, may cause the processor 104 to perform the following: receiving a payment authorization request message having a predefined first format via a communication protocol TCPIP socket including an application process called socket manager corresponding to a card transaction; collecting application data from the message in connection with the card transaction; aggregating and storing a subset of the application data in a dynamically allocated shared memory and storing location of the dynamically allocated shared memory in a CWA (common work area) accessible to all processes running in a same CICS region; implementing a monitoring process to obtain the location of the dynamically allocated shared memory by accessing the CWA and reading the aggregated application data from the dynamically allocated shared memory; storing a current snapshot of aggregated metrics and statistical data in a transient data queue assigned or attached to a specific socket manager; computing a difference of the metrics data by comparing the data with the dynamically allocated shared memory with last saved values of transient data queue for that socket manager; converting, in response to reading, the predefined first format of the aggregated subset of payment authorization request message to a predefined second format suitable for publishing onto a desired messaging platform; and publishing the converted message onto the desired messaging platform.

According to exemplary embodiments, the instructions, when executed, may cause the processor 104 to further perform the following: receiving a plurality of payment authorization request messages via a plurality of communication protocol TCPIP sockets each including a corresponding socket manager; storing the metrics and statistical data in a corresponding transient data queue attached to the corresponding socket manager; periodically collecting metrics and statistical data from all socket manager transient data queues; and aggregating and storing the collected metrics and statistical data from all of the socket manager transient data queues onto the dynamically allocated shared memory. For example, according to exemplary embodiments, the data may flow from the dynamically allocated shred memory to the transient data queues.

According to exemplary embodiments, the instructions, when executed, may cause the processor 104 to further perform the following: consuming the formatted message from the desired messaging platform by a plurality of visualization tools that provides dashboard feature via different visualization charts such as but not limited to pie chart, bar chart, scattered plot, line plot, time series, etc.; identifying an alert in accordance with predefined rules; transmitting the alter or provide feedback data to mainframe system where the application is running via corresponding application programming interface (API) or message queue (MQ); and triggering an automatic predefined mitigation process in one scenario by updating the command section of the shared memory that is watched constantly or periodically by the socket manager, in response to receiving the alert, to mitigate issues identified in the alert or the feedback data.

According to exemplary embodiments as disclosed above in FIGS. 1-8, technical improvements effected by the instant disclosure may include a platform for implementing a robust application monitoring module on a mainframe system that checks constant health of an application and get notified and alerted when there is any system issue, but the disclosure is not limited thereto. For example, according to exemplary embodiments as disclosed above in FIGS. 1-8, technical improvements effected by the instant disclosure may include a platform for building a robust application monitoring module on a mainframe system that may intercept, collect and aggregate metrics data real-time and, then may convert them and make them available to third-party tools. Additionally, according to exemplary embodiments as disclosed above in FIGS. 1-8, technical improvements effected by the instant disclosure may include a platform for implementing a robust application monitoring module that can integrate back the alerts and feedbacks provided by the third-party tools back to the mainframe system to take certain actions, but the disclosure is not limited thereto. According to exemplary embodiments as disclosed above in FIGS. 1-8, technical improvements effected by the instant disclosure may include a platform for implementing the robust application monitoring module that is a generic framework that can be implemented on any desired mainframe system and can be adopted for any desired metrics collection and dashboard, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for monitoring application by utilizing one or more processors and one or more memories, the method comprising:
    calling, by an application process, a socket manager corresponding to a card transaction;
    receiving, via a communication protocol TCPIP socket including the application process called socket manager corresponding to the card transaction, a request to authorize a payment having a COBOL copybook format;
    collecting application data from the request in connection with the card transaction;
    aggregating and storing a subset of the application data in a dynamically allocated shared memory and storing location of the dynamically allocated shared memory in a CWA (common work area) accessible to all processes running in a same CICS region;
    implementing a monitoring process to obtain the location of the dynamically allocated shared memory by accessing the CWA and reading the aggregated application data from the dynamically allocated shared memory;
    storing a current snapshot of aggregated metrics and statistical data in a transient data queue assigned or attached to a specific socket manager;
    computing a difference of the metrics data by computing a difference between the data with the dynamically allocated shared memory and last saved values of transient data queue for that socket manager;
    storing, in response to reading, the data into persistence data store for instant access and recovery in case of system failure or application restart;
    converting, in response to reading, the COBOL copybook format of the aggregated subset of the request to authorize the payment to a predefined second format suitable for publishing onto a desired messaging platform; and
    publishing the converted request onto the desired messaging platform.

2. The method according to claim 1, the method further comprising: implementing the transient data queue in an environment that utilizes mixed-language application servers that provide online transaction management and connectivity for applications on predefined mainframe systems.

3. The method according to claim 1, wherein the application data includes metrics and statistics of the card transaction.

4. The method according to claim 1, wherein the COBOL copybook format is converted to one or more of the following formats: .JSON, .CSV, .HTML, .XML, and .XLS.

5. The method according to claim 1, further comprising:
    receiving a plurality of requests to authorize payments via a plurality of communication protocol TCPIP sockets each including a corresponding socket manager;
    storing the metrics and statistical data in a corresponding transient data queue attached to the corresponding socket manager;
    periodically collecting metrics and statistical data from all socket manager transient data queues; and
    aggregating and storing the collected metrics and statistical data from all of the socket manager transient data queues onto the dynamically allocated shared memory.

6. The method according to claim 1, further comprising:
    consuming the converted request from the desired messaging platform by a plurality of visualization tools;
    identifying an alert in accordance with predefined rules;
    transmitting the alert or providing feedback data to mainframe system where the application is running via corresponding application programming interface (API) or message queue (MQ); and
    in response to receiving the alert, mitigating issues identified in the alert or the feedback data, by triggering an automatic predefined mitigation process.

7. The method according to claim 1, further comprising:
in response to the application process calling the socket manager, initiating the socket manager, wherein the socket manager is a COBOL program that implements a TCPIP socket interface; and
performing, by the socket manager, an automated action based on a command applied on the dynamically allocated shared memory, wherein the command is at least one from among: stop socket manager, recycle socket manager, enable debugging and tracing of messages, and route incoming message traffic to a healthy socket manager.

8. A system for monitoring application comprising:
a processor; and
a memory operatively connected to the processor via a communication interface, the memory storing computer readable instructions, when executed, cause the processor to:
call, by an application process, a socket manager corresponding to a card transaction;
receive, via a communication protocol TCPIP socket including the application process called socket manager corresponding to the card transaction, a request to authorize a payment having a COBOL copybook format;
collect application data from the request in connection with the card transaction;
aggregate and store a subset of the application data in a dynamically allocated shared memory and store location of the dynamically allocated shared memory in a CWA (common work area) accessible to all processes running in a same CICS region;
implement a monitoring process to obtain the location of the dynamically allocated shared memory by accessing the CWA and read the aggregated application data from the dynamically allocated shared memory;
store a current snapshot of aggregated metrics and statistical data in a transient data queue assigned or attached to a specific socket manager;
compute a difference of the metrics data by computing a difference between the data with the dynamically allocated shared memory and last saved values of transient data queue for that socket manager;
store, in response to reading, the data into persistence data store for instant access and recovery in case of system failure or application restart;
convert, in response to reading, the COBOL copybook format of the aggregated subset of the request to authorize the payment to a predefined second format suitable for publishing onto a desired messaging platform; and
publish the converted request onto the desired messaging platform.

9. The system according to claim 8, wherein the computer executable instructions, when executed, further cause the processor to: implement the transient data queue in an environment that utilizes mixed-language application servers that provide online transaction management and connectivity for applications on predefined mainframe systems.

10. The system according to claim 8, wherein the application data includes metrics and statistics of the card transaction.

11. The system according to claim 8, wherein the COBOL copybook format is converted to one or more of the following formats: .JSON, .CSV, .HTML, .XML, and .XLS.

12. The system according to claim 8, wherein the computer readable instructions, when executed, further cause the processor to:
receive a plurality of requests to authorize payments via a plurality of communication protocol TCPIP sockets each including a corresponding socket manager;
store the metrics and statistical data in a corresponding transient data queue attached to the corresponding socket manager;
periodically collect metrics and statistical data from all socket manager transient data queues; and
aggregate and store the collected metrics and statistical data from all of the socket manager transient data queues onto the dynamically allocated shared memory.

13. The system according to claim 8, wherein the computer readable instructions, when executed, further cause the processor to:
consume the converted request from the desired messaging platform by a plurality of visualization tools;
identify an alert in accordance with predefined rules;
transmit the alert or provide feedback data to mainframe system where the application is running via corresponding application programming interface (API) or message queue (MQ); and
in response to receiving the alert, mitigate issues identified in the alert or the feedback data, by triggering an automatic predefined mitigation process.

14. The system according to claim 8, wherein the processor is further configured to:
in response to the application process calling the socket manager, initiating the socket manager, wherein the socket manager is a COBOL program that implements a TCPIP socket interface; and
performing, by the socket manager, an automated action based on a command applied on the dynamically allocated shared memory, wherein the command is at least one from among: stop socket manager, recycle socket manager, enable debugging and tracing of messages, and route incoming message traffic to a healthy socket manager.

15. A non-transitory computer readable medium storing instructions for monitoring application, wherein, when executed, the instructions cause a processor to perform the following:
calling, by an application process, a socket manager corresponding to a card transaction;
receiving, via a communication protocol TCPIP socket including the application process called socket manager corresponding to the card transaction, a request to authorize a payment having a COBOL copybook format;
collecting application data from the request in connection with the card transaction;
aggregating and storing a subset of the application data in a dynamically allocated shared memory and storing location of the dynamically allocated shared memory in a CWA (common work area) accessible to all processes running in a same CICS region;
implementing a monitoring process to obtain the location of the dynamically allocated shared memory by accessing the CWA and reading the aggregated application data from the dynamically allocated shared memory;
storing a current snapshot of aggregated metrics and statistical data in a transient data queue assigned or attached to a specific socket manager;
computing a difference of the metrics data by computing a difference between the data with the dynamically allocated shared memory and last saved values of transient data queue for that socket manager;

storing, in response to reading, the data into persistence data store for instant access and recovery in case of system failure or application restart;

converting, in response to reading, the COBOL copybook format of the aggregated subset of the request to authorize the payment to a predefined second format suitable for publishing onto a desired messaging platform; and publishing the converted request onto the desired messaging platform.

16. The non-transitory computer readable medium according to claim 15, wherein the instructions further cause the processor to perform the following: implementing the transient data queue in an environment that utilizes mixed-language application servers that provide online transaction management and connectivity for applications on predefined mainframe systems.

17. The non-transitory computer readable medium according to claim 15, wherein the application data includes metrics and statistics of the card transaction.

18. The non-transitory computer readable medium according to claim 15, wherein the COBOL copybook format is converted to one or more of the following formats: .JSON, .CSV, .HTML, .XML, and .XLS.

19. The non-transitory computer readable medium according to claim 15, wherein the instructions, when executed, further causes the processor to perform the following:

receiving a plurality of requests to authorize payments via a plurality of communication protocol TCPIP sockets each including a corresponding socket manager;

storing the metrics and statistical data in a corresponding transient data queue attached to the corresponding socket manager;

periodically collecting metrics and statistical data from all socket manager transient data queues; and aggregating and storing the collected metrics and statistical data from all of the socket manager transient data queues onto the dynamically allocated shared memory.

20. The non-transitory computer readable medium according to claim 15, wherein the instructions, when executed, further causes the processor to perform the following:

consuming the converted request from the desired messaging platform by a plurality of visualization tools;

identifying an alert in accordance with predefined rules;

transmitting the alert or providing feedback data to mainframe system where the application is running via corresponding application programming interface (API) or message queue (MQ); and in response to receiving the alert, mitigating issues identified in the alert or the feedback data, by triggering an automatic predefined mitigation process.

* * * * *